United States Patent [19]
Cwik et al.

[11] Patent Number: 6,109,661
[45] Date of Patent: Aug. 29, 2000

[54] FLEXIBLE COUPLER APPARATUS

[75] Inventors: Scott C. Cwik, Lake in the Hills; Robert C. Clarke, St. Charles, both of Ill.

[73] Assignee: Senior Engineering Investments AG, Switzerland

[21] Appl. No.: 09/293,472

[22] Filed: Apr. 16, 1999

[51] Int. Cl.⁷ .................................................. F16L 11/12
[52] U.S. Cl. ............................ 285/45; 285/49; 285/299; 285/330; 285/906
[58] Field of Search ............................. 285/49, 222, 300, 285/299, 298, 301, 330, 45, 906

[56] References Cited

FOREIGN PATENT DOCUMENTS

| | | |
|---|---|---|
| 0 281 685 | 9/1988 | European Pat. Off. .................... 27/10 |
| 28 42 895 | 5/1980 | Germany ..................... 51/2 |
| 85 35 523 U | 4/1987 | Germany ..................... 51/2 |
| 296 12 590 U | 11/1996 | Germany ..................... 23/36 |

*Primary Examiner*—Dave W. Arola
*Attorney, Agent, or Firm*—Dick and Harris

[57] ABSTRACT

A flexible coupler apparatus for joining successive exhaust system components in an exhaust system for a vehicle. An inner liner tube is concentrically received by an outer liner tube. A substantially porous, non-sealing, vibration absorbing spacer member is arranged between the liner tubes where they overlap, to preclude direct contact between the liner tubes. The spacer member is non-sealing to preclude deterioration while minimizing interference with the reciprocation and articulation of the liner tubes. A flexible, resilient sealing member, such as a bellows, mechanically and sealingly connects the liner tubes at their distant non-overlapped ends, to prevent escape of exhaust gases. The liner tubes and the spacer member are provided with a non-circular, preferably polygonal or lobed, cross-sectional configurations, for providing protection of the bellows from torsional forces being propagated from one of the exhaust system components, toward the other.

11 Claims, 7 Drawing Sheets

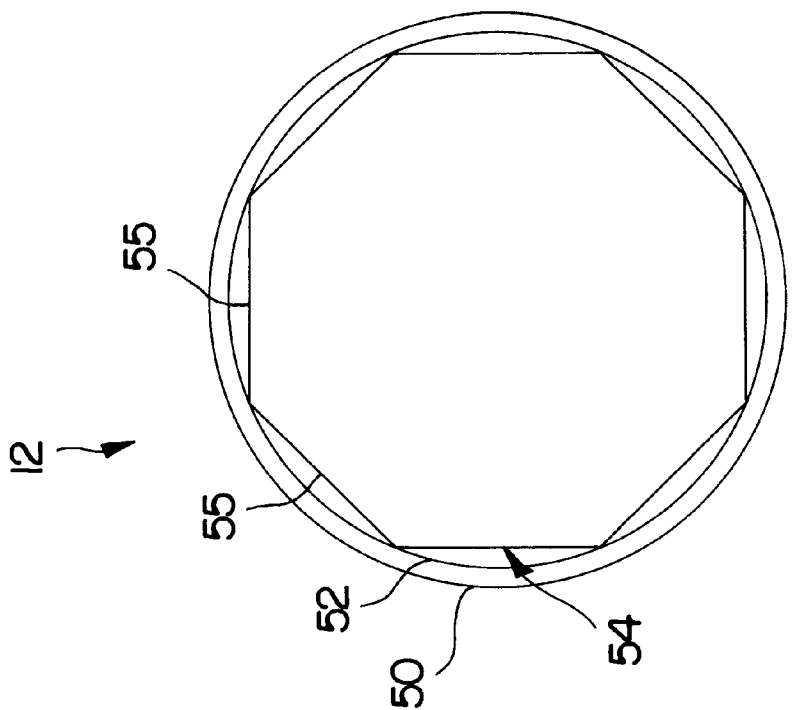
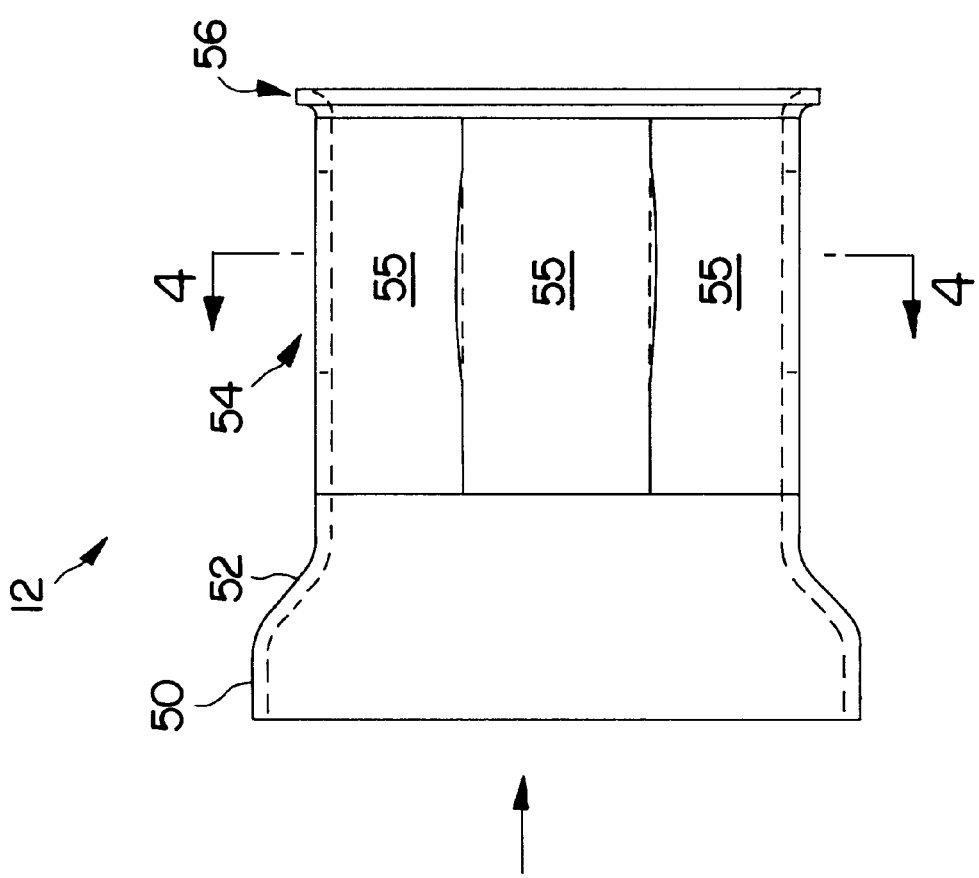

FLEXIBLE COUPLER APPARATUS

BACKGROUND OF THE INVENTION

1. Field of the Invention

The present invention relates to couplers for joining the ends of successive lengths of pipe, conduit or other related components, and in particular to couplers for joining the ends of successive pipes or other components (e.g., an exhaust manifold) in an exhaust system for vehicles.

2. The Prior Art

It is well known that, in vehicle exhaust systems, particularly those for heavy duty vehicles, such as large trucks, the motors produce a significant amount of vibration in the exhaust system components. Operation of the motors at continuous speeds for prolonged periods of time can, especially, produce what are known as harmonic vibrations which can cause deflections of significant magnitude and/or frequency along the extended length of an exhaust system, from the exhaust manifold through to the tailpipe, unless otherwise attenuated. Repeated deflections of the exhaust system components can, in turn, cause one or more of the components to weaken with time and ultimately fail. Further, such harmonic vibrations will also be transmitted through the exhaust system components to the mountings of the components, promoting the loosening of the mountings, which can result in the sudden displacement of one or more components of the exhaust system, with the potential for both personal injury and equipment damage.

In addition to the vibrations created by the motor of the vehicle, an exhaust system is also subjected to various tension, compression and bending forces which arise during the operation of the vehicle. While individual components might be made stronger and more massive to resist failure by fatigue, such construction would be undesirable due to weight considerations. Further, by making individual elements stiffer, the vibrations are merely transmitted to the exhaust system mountings or other components, not reduced or eliminated. Accordingly, it is desirable to isolate the exhaust system, or at least components of the system from such vibrations and forces.

It is known that if the pipes of an exhaust system are divided and separated by non-rigid connections, rather than as continuous extended lengths, the development of harmonic vibrations from the motor is precluded or reduced. Such non-rigid connections can be advantageously employed to absorb other tension, compression and bending forces, in addition to motor vibrations.

It is therefore desirable to provide a coupler for joining successive components of an exhaust system, which coupler joins the successive components in a non-rigid fashion and is capable of absorbing tension, compression and bending forces, without transmitting them from one component to the next.

An example of a prior art coupler is U.S. Pat. No. 4,792,161 to Usui. In Usui, a pair of concentrically arranged, non-sealing spring coils are utilized to provide a mechanical connection between the pipes to be joined. One drawback of the coupler in Usui is that when the coils are in a stretched or bent position, gaps may form between individual bights of the coil, into which dirt, debris and moisture may invade, which may interfere with the operation of the coils, and lead to ultimate degradation of the coils through abrasion, rusting, and so forth. In addition, the coils (which are arranged one threaded within the other) are unprotected and exposed to the elements at all times, and are thus susceptible to damage from abrasion and other harmful physical contact. A further drawback of the coupler in Usui is that a sealing ring, positioned between overlapping pipe ends, is relied upon to provide sealing means to prevent escape of the exhaust gases. The sealing ring is subjected to cyclical flexure, tension and compression forces which will can ultimately compromise the seal to potentially require replacement of the coupler.

Another example of a vibration decoupling flexible connector is Udell, U.S. Pat. No. 5,145,215. In the apparatus of Udell, two liner tubes are provided which have overlapping free ends. The inner one of the overlapping tubes has a radially outwardly extending flange emanating from the tip of its free end. The outer one of the overlapping tubes has a radially inwardly extending flange emanating from the tip of its free end. The two flanges define an axially bounded annular space, in which is positioned a cylindrical annular spacer member. In one embodiment of the Udell apparatus, the annular spacer member is fabricated as a compressed metal mesh ring, which is porous, to at least some degree. A bellows member circumferentially surrounds and axially overlaps the overlapping region of the inner and outer liner tubes. The bellows is affixed, directly or indirectly, to the liner tubes. The axially outer ends of the liner tubes are then affixed to upstream and downstream exhaust system components, such as a downpipe from an exhaust manifold (upstream) and a length of exhaust tube (downstream).

Because the inner and outer liner tubes and the annular spacer member are all circular in cross-section, there is less resistance in the overlapping liner tubes and spacer member, to torsional forces (e.g., twisting of one or the other of the components around the common longitudinal axis of the joint). Typically, the downstream exhaust tube is clamped against such torsionally prompted twisting. Therefore, if the upstream exhaust component (e.g., the exhaust manifold) undergoes twisting movements, this twisting torsional force could be transferred to the upstream liner tube and, in turn, to the upstream end of the bellows. Because the downstream end of the bellows is affixed to the downstream liner tube, and, in turn, to the downstream exhaust system component, the bellows itself takes the brunt of the torsional shearing load. Bellows, typically, are not well suited to prolonged or repeated exposure to significant torsional loads, which loads could have adverse effects on the performance and durability of such bellows—relative to bellows structures which are not exposed to such torsional loads.

It is therefore an object of this invention to provide a flexible coupler for placement between successive components in an exhaust system for damping and blocking the transmission of vibration and other forces from one component to the next which is durable and not subject to attack by dirt, debris and the elements.

Yet another object of the invention is to provide a flexible coupler which does not utilize a sealing means positioned between moving exhaust system components which may cause the seal to prematurely yield requiring replacement of the coupler.

It is further an object of this invention to provide a flexible coupler for exhaust system components which provides means for mechanically connecting the ends of the components to be joined, which means are themselves protected from interference and/or degradation by external forces and elements.

Still yet another object of the invention is to provide a flexible coupler apparatus for exhaust system components which provides improved audio isolation to reduce or preclude migration of motor noise into the passenger compartment of the vehicle.

A still further object of the invention is to provide a flexible coupler for exhaust system components which incorporates a bellows member for preventing leakage of exhaust gases, which further provides means for protecting the bellows structure from torsional loads to which it may be exposed.

These and other objects of the invention will become apparent in light of the present specification, claims and drawings.

SUMMARY OF THE INVENTION

The present invention is directed to a flexible coupler apparatus for connecting adjacent ends of first and second successive components in a fluid transmission system, while substantially precluding transmission of axial, transverse and bending forces between the successive components.

The flexible coupler apparatus comprises an inner liner tube, having an end operably affixable, at least indirectly, to the first of the successive components, and having a free end, and further having a spacer member receiving region, the spacer member receiving region of the inner liner tube being disposed on an outer surface thereof. An outer liner tube has an end operably affixable, at least indirectly, to the second of the successive components. The outer liner tube also has a free end, and further has a spacer member receiving region, the spacer member receiving region of the outer tube member being disposed on an inner surface thereof.

The free end of the outer liner tube slidingly receives and axially overlaps the free end of the inner liner tube, so that the spacer receiving region of the outer liner tube substantially axially overlaps the spacer receiving region of the inner liner tube.

An annular space is disposed between the inner surface of the spacer receiving region of the outer liner tube and the outer surface of the spacer receiving region of the inner liner tube.

The inner and outer liner tubes are operably configured for axial, transverse and bending movements relative to one another, to, in turn, enable axial, transverse and bending movements of the first and second successive components of the fluid transmission system relative to one another.

A vibration absorbing spacer member is positioned in the annular space between the inner surface of the spacer receiving region of the outer liner tube and the outer surface of the spacer receiving region of the inner liner tube, for maintaining the inner surface of the spacer receiving region of the outer liner tube in radially spaced relation to the outer surface of the spacer receiving region of the inner liner tube, and for substantially precluding transmission of axial, transverse and bending movements between the inner and outer liner tubes.

A resilient sealing member is sealingly affixed, at least indirectly, at one end to the outer liner tube and at the other end, to the inner liner tube, for maintaining the first and second successive components in flexible joined relation to one another, and preclude escape of fluid from the flexible coupler apparatus.

At least each of the inner surface of the spacer member receiving region of the outer liner tube, the outer surface of the spacer member receiving region of the inner liner tube and the spacer member, have a non-circular, substantially faceted cross-sectional configuration, to transmit applied torsional forces from said one of the inner and outer liner members to the other of the inner and outer liner tubes, towards substantially reducing the extent to which such torsional forces are borne by said resilient sealing member.

In a preferred embodiment of the invention, the non-circular, substantially faceted cross-sectional configuration of said at least each of the inner surface of the spacer member receiving region of the outer liner tube, the outer surface of the spacer member receiving region of the inner liner tube and the spacer member is a polygon. Preferably, the polygon is a regular octagon.

In an alternative preferred embodiment of the invention, the noncircular, non-continuously curved cross-sectional configuration of each of the inner surface of the spacer member receiving region of the outer liner tube, the outer surface of the spacer member receiving region of the inner liner tube and the spacer member is a lobed configuration.

In the embodiment wherein the spacer member is polygonal, according to an alternative embodiment of the invention, the polygonal spacer member has a plurality of sides, wherein at least one of the sides has a radial thickness which is substantially different from at least one other of the sides.

The flexible coupler apparatus may further have means for limiting axial movement of the inner liner tube relative to the outer liner tube. In a preferred embodiment of the invention, the means for limiting axial movement of the inner liner tube relative to the outer liner tube comprises at least a first lip extending radially inwardly from at least a portion of the free end of the outer liner tube; and at least a second lip extending radially outwardly from at least a portion of the free end of the inner liner tube.

Preferably, the resilient sealing member is a flexible tubular bellows having a plurality of circumferential convolutions formed thereon.

The spacer member is preferably fabricated from compressed mesh material. The spacer member is preferably fabricated from at least one material from the group consisting of metal mesh, ceramic wool.

The flexible coupler apparatus may further include at least one end cap, operably disposed about an end of the resilient sealing member and operably configured for substantially circumferentially surrounding at least a portion of the resilient sealing member for substantially protecting same against undesired contact from external forces.

BRIEF DESCRIPTION OF THE DRAWINGS

FIG. 3 is a side elevation of the inner liner tube of the flexible coupler apparatus according to the embodiment of FIGS. 1 and 2.

FIG. 4 is a cross-sectional elevation of the inner liner tube of the flexible coupler apparatus according to the embodiment of FIGS. 1–3, taken along lines 4—4 of FIG. 3.

BEST MODE FOR CARRYING OUT THE INVENTION

Figure 1:
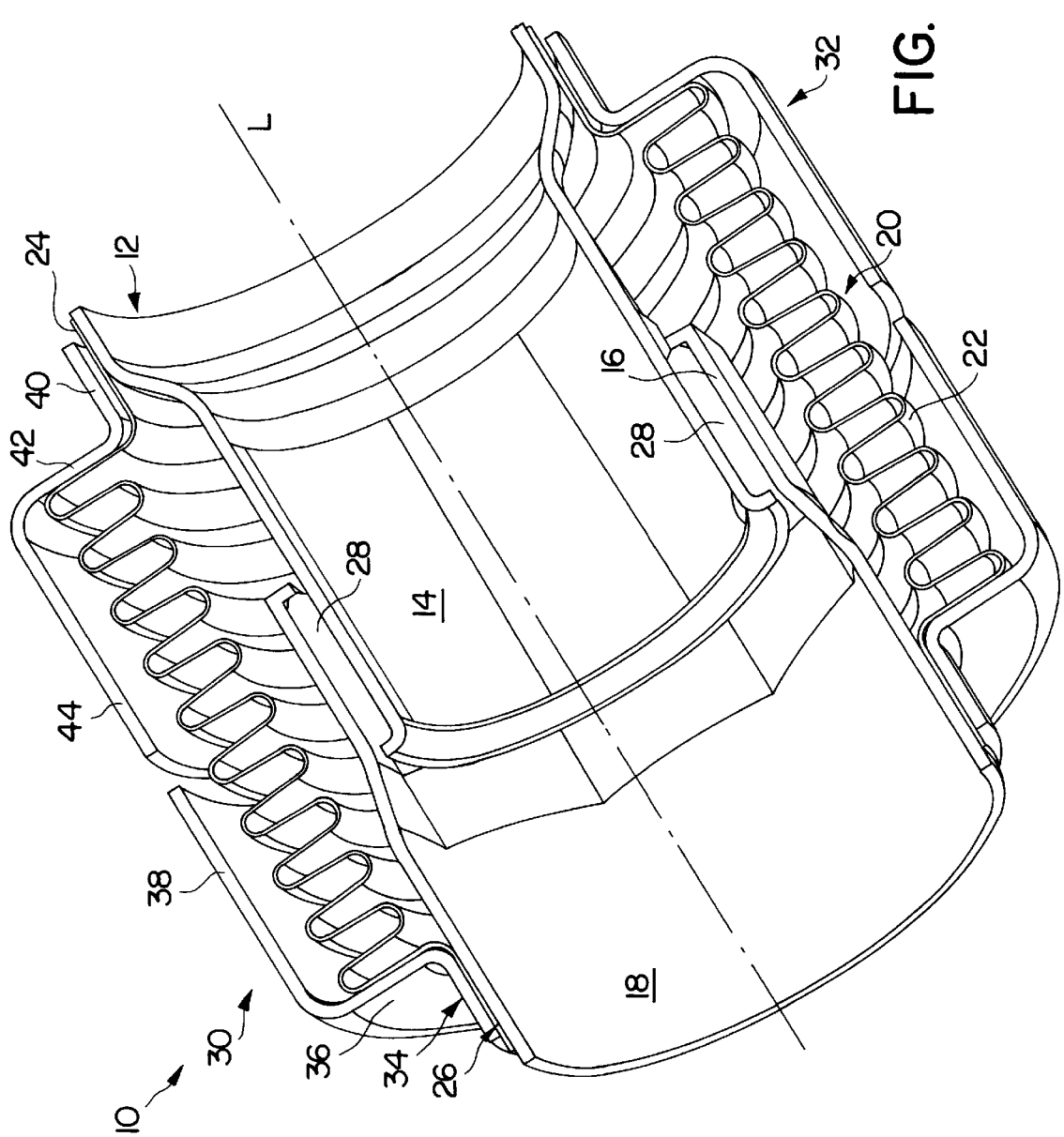
FIG. 1 is a perspective sectional view of the flexible coupler apparatus according to one embodiment of the invention.

While this invention is susceptible of embodiment in many different forms, there is shown in the drawings and will herein be described in detail, several embodiments, with the understanding that the present disclosure is to be considered as an exemplification of the principles of the invention and is not intended to limit the invention to the embodiments illustrated.

Figure 2:
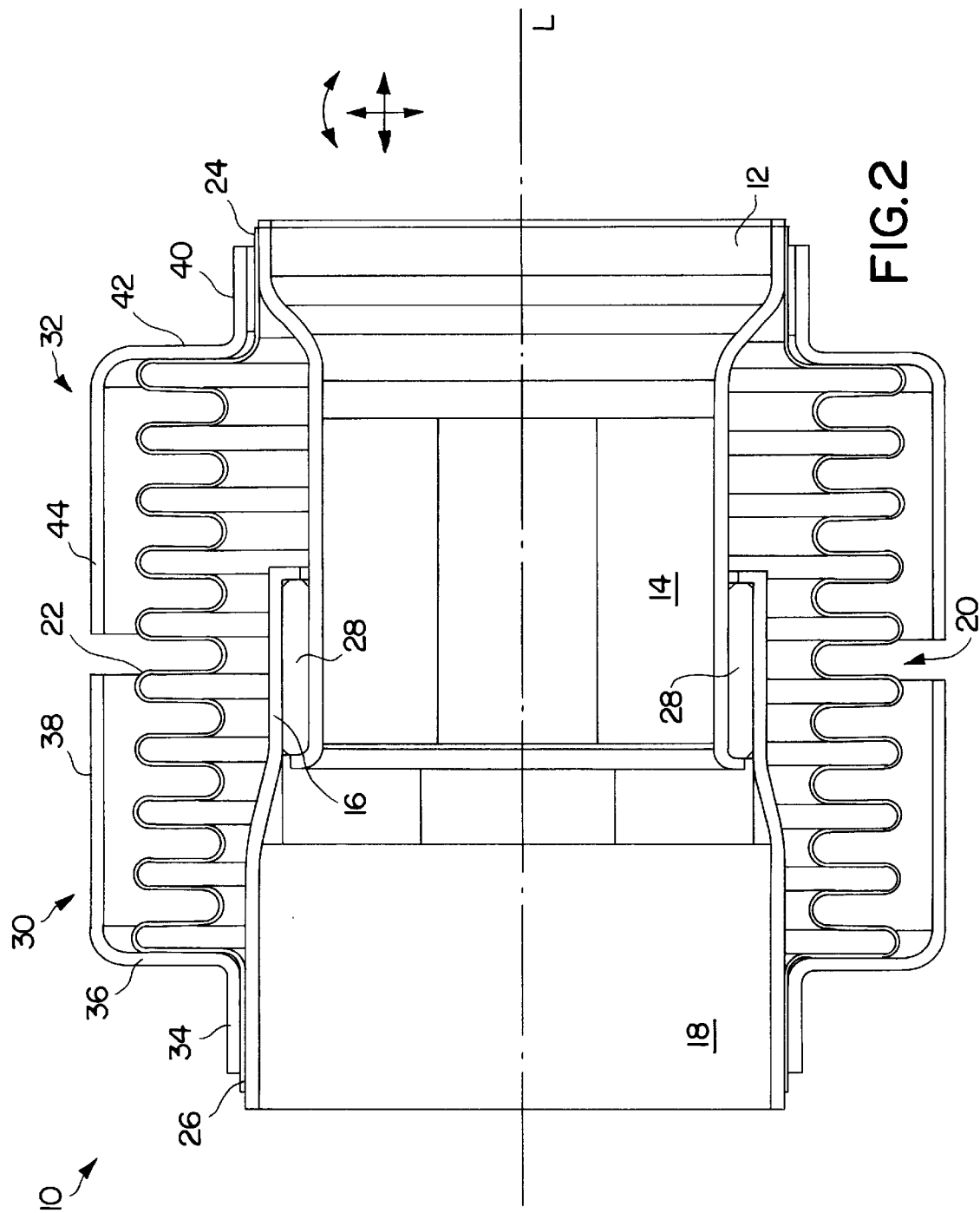
FIG. 2 is a side elevation, partially in section, of the flexible coupler apparatus according to FIG. 1.

The flexible coupler apparatus according to a preferred embodiment is shown in a sectional perspective view in FIG. 1, and side sectional elevation in FIG. 2. Flexible coupler apparatus 10 has a longitudinal axis L. Flexible coupler apparatus 10 includes inner liner tube 12, a free end 14 of which is insertingly received within a free end 16 of outer liner tube 18. Free end 16 of outer liner tube 18 thus overlaps free end 14 of inner liner tube 12. A bellows 20, having a central corrugated section 22 and cylindrical end sections 24 and 26, circumferentially surrounds and axially overlaps the overlapping portions of inner liner tube 12 and outer liner tube 18. Spacer member 28 is radially enclosed between free end 14 of inner liner tube 12 and free end 16 of outer liner tube 18.

Flexible coupler apparatus 10 also includes end caps 30 and 32 (shown in FIG. 2). End end cap 30 has first cylindrical portion 34, radial portion 36 and second cylindrical portion 38, at one end. End cap 32 has first cylindrical portion 40, radial portion 42 and second cylindrical portion 44. End cap 30 is preferably affixed at first cylindrical portion 34, e.g., by simple crimping, welding, or other suitable technique, to bellows neck 26 and/or to outer liner tube 18. End cap 32 is likewise preferably affixed at first cylindrical portion 40, e.g., by simple crimping, welding or other suitable technique, to bellows neck 24 and/or to inner liner tube 12.

FIGS. 3 and 4 illustrate in further detail inner liner tube 12. The direction of flow of gases through the tube is indicated by the arrow in FIG. 3. Inner liner tube 12 includes cylindrical section 50, shoulder region 52, spacer member receiving region 54, and a radially outwardly extending lip 56 (not shown in FIG. 4). Spacer member receiving region 54 is formed with a polygonal outer surface, as shown in FIG. 4. In a preferred embodiment of the invention, spacer member receiving region 54 comprises an octagon (the outer surface) in cross-section, with eight circumferentially symmetrically positioned, flats 55 of preferably equal width and axial length, from flat to flat. Formation of the flats 55 may be readily accomplished by one of ordinary skill in the art, having the present disclosure before them, by one of several known methods. For example, inner liner tube 12 may be placed on a circular or octagonal mandrel, and then die having an octagonal inner opening may be rammed down onto the tube, so that the tube becomes captured between the mandrel and the die, and is pressed, in the region 54, into the octagonal configuration. Other apparatus and method are also known for forming cylindrical tube into tubes having polygonal crosssections, and so do not need to be described in further detail herein.

It is to be understood that the components of flexible coupler apparatus 10 are illustrated herein in a somewhat simplified form, in particular with respect to the construction of the inner and outer liner tubes, in the transition regions between the cylindrical tube portions and the octagonal flats. It is to be further understood that depending upon the particular formation process which is employed, there may be longitudinally short concavely or convexly contoured surfaces (relative to the overall length of the flat sides), in such transition regions, or at the axial end portions of the flat sides. For simplicity of the drawings, these transitional regions have been shown by simple straight transverse lines, extending across each of the inner and outer liner tubes. These transition regions (not shown) are simply the result of the particular formation process which may be selected, and do not affect the performance of the overall apparatus, vis-a-vis the transmission of torsional forces from one of the liner tubes, via the contoured sides of that liner tube's spacer member receiving region, through the spacer member, to the other of the liner tubes, via the contoured sides of that liner tube's spacer member receiving region.

Figure 6:
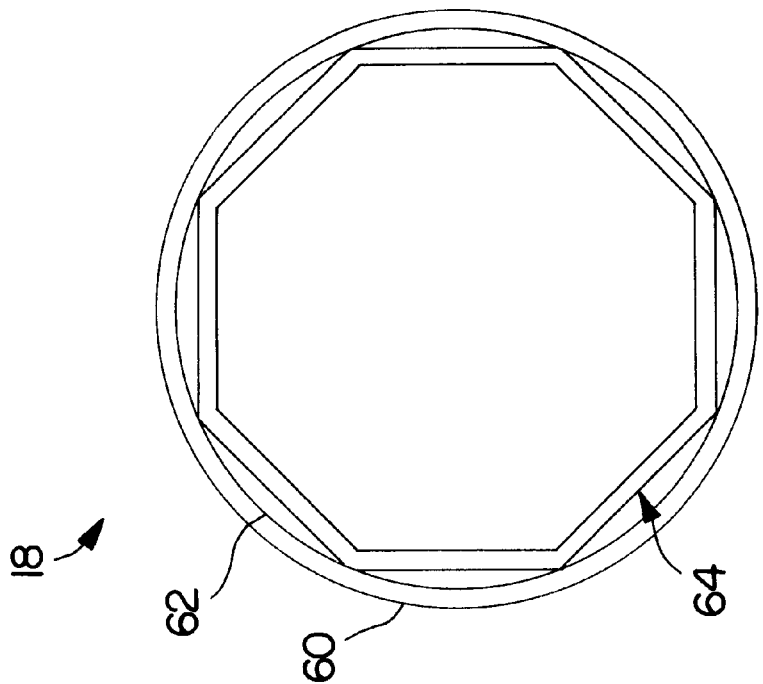
FIG. 6 is a cross-sectional elevation of the outer liner tube of the flexible coupler apparatus according to the embodiment of FIGS. 1–5, taken along lines 6—6 FIG. 5.
Figure 5:
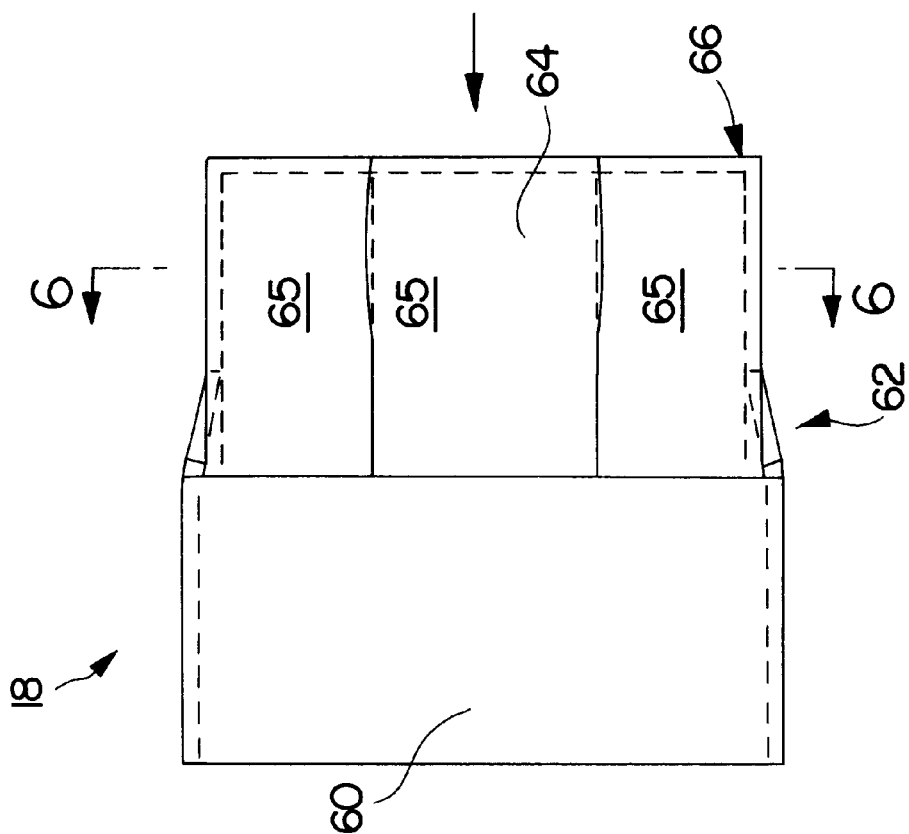
FIG. 5 is a side elevation of the outer liner tube of the flexible coupler apparatus according to the embodiment of FIGS. 1–4.

FIGS. 5 and 6 illustrate in further detail outer liner tube 18. The typical direction of flow of gases through the tube is indicated by the arrow in FIG. 5. This is to create a flow from the inner liner tube to the outer liner tube, which may be preferred and/or desirable, in some circumstances. In other circumstances, the flow may be from the outer liner tube to the inner liner tube. Outer liner tube 18 includes cylindrical section 60, shoulder region 62, spacer member receiving region 64, and a radially inwardly extending lip 66 (not shown in FIG. 6). Spacer member receiving region 64 is formed with a polygonal inner surface, as shown in FIG. 6. In a preferred embodiment of the invention, spacer member receiving region 64 comprises an octagon (the inner surface) in cross-section, with eight circumferentially symmetrically positioned, flats 65 of preferably equal width and axial length, from flat to flat.

Formation of the flats 65 may be readily accomplished by one of ordinary skill in the art, having the present disclosure before them, by one of several known methods. For example, one apparatus which may be used is called an "10 sizer", manufactured by Eagle Mfg. Co. of Brantford, Ontario, Canada. The apparatus employs a plurality (eight, for an octagon) of radially movable flat-faced "fingers" which are inserted into an unformed tube. A collar, which likewise may have a plurality of flat-faced fingers, or simply an octagonal aperture therethrough, is fitted over the tube. A ram member (like an octagonal spike) is forced centrally between the fingers that are inserted into the tube, to force the inner set of fingers against the material of the tube, outwardly against the inner surface of the outer set of fingers of the collar (or of the inner surface of the octagonal aperture of the collar), to create the octagonal cross-section of the spacer member receiving region 64. Other methods may be employed, such as the ram and die method described with respect to the inner liner tube 12, which may be readily perceived by one of ordinary skill in the art, having the present disclosure before them, and so do not need to be described in detail herein.

Figure 8:
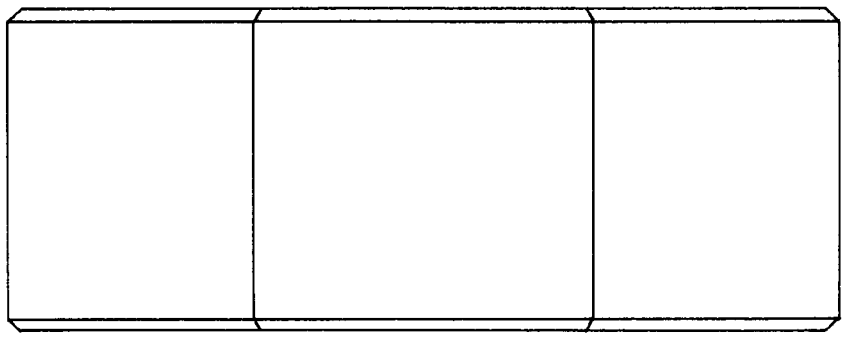
FIG. 8 is a side elevation of the spacer member of FIG. 7.
Figure 7:
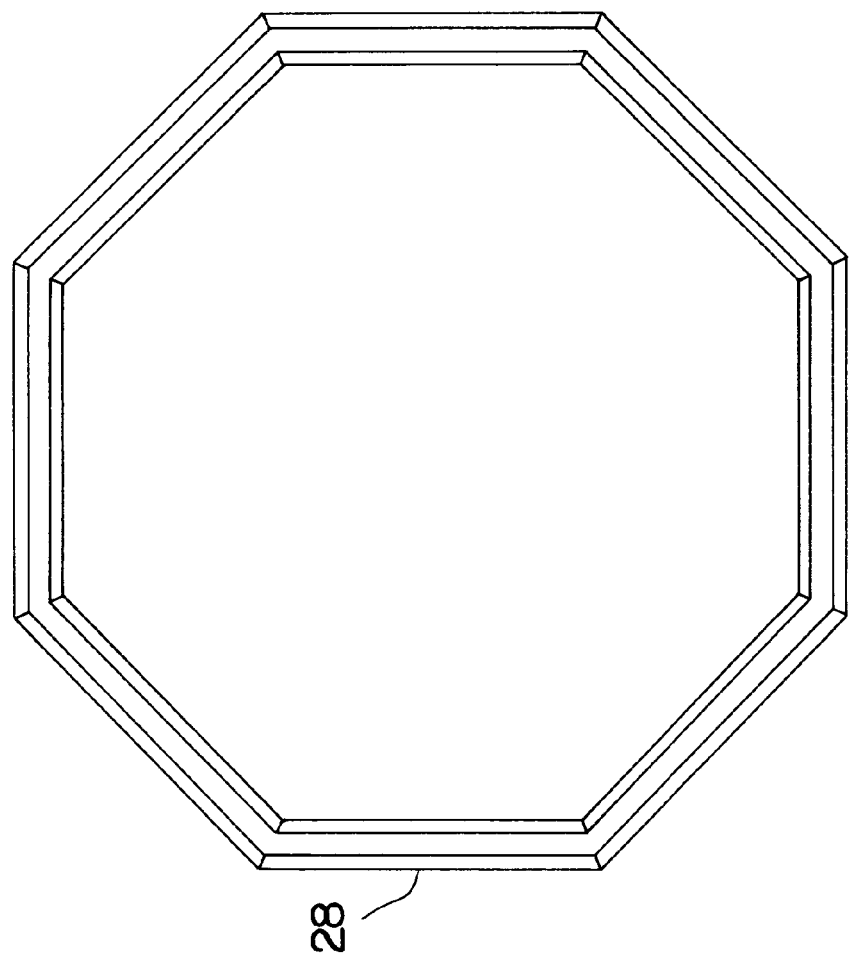
FIG. 7 is an end-on elevation of the spacer member, according to the embodiment of the invention of FIGS. 1–6.

FIGS. 7 and 8 illustrate spacer member 28, according to the embodiment of the invention of FIGS. 1–6. Spacer member 28 is preferably fabricated from compressed metal mesh, which may further be impregnated with vermiculitegraphite compounds for lubrication and prevention of squeaking. Cylindrical annular spacer members are known in the art, such as are commercially available and can be obtained from firms such as ACS Industries, Inc., of Woonsocket, Rhode Island. In addition to forming the mesh ring from metal, ceramic wools and other similar materials may also be employed in addition to or instead of metal mesh. Such a spacer member 28, while dense, is typically at least somewhat porous.

It is necessary to form the spacer member 28 into the octagonal cross-sectional configuration prior to fitting of the spacer member 28 onto inner liner tube 12, prior to formation of lip 56. This is because if the mesh ring spacer member 28 is formed by the pressing of the outer liner tube 18 over and onto inner liner tube 12, some axial extrusion of the mesh material may occur.

Preferably, when the components described hereinabove are assembled, there is a snug fit between the spacer member 28, and the outer surface of spacer member receiving region 14 and the inner surface of spacer member receiving region 16, when the flexible coupler apparatus is in a "neutral" position, when installed. Similarly, the components are so arranged that, when installed and in a neutral position (as shown in FIG. 2), spacer member 28 is snugly positioned between lips 56 and 66, without gaps at the ends of the spacer member. With this neutral position, if the inner and outer liner tubes are pressed toward one another, to compress the flexible coupler apparatus, there will be sufficient axial room in spacer member receiving region 14 to permit compression of the flexible coupler apparatus. Typically, flexible coupler apparatus 10 will be installed in such circumstances that anticipated axial extension, beyond neutral, will not be great in magnitude. Accordingly, to the extent that the flexible coupler apparatus is exposed to forces tending to extend the flexible coupler apparatus beyond neutral, the mesh material of the spacer member 28 will be compressed, to absorb such transient compressive forces as may occur, during axial extension of the coupler apparatus.

In addition, there are radial gaps between lip 56 and the inner surface of outer liner tube 18, and between lip 66, and the outer surface of inner liner tube 12. Further, while spacer member 28 may be quite dense, there will still be sufficient compressibility in the spacer member, and/or radial annular clearance between the components, to permit at least some bending movements of outer liner tube 18, relative to inner liner tube 12, for example, about an axis perpendicular to a longitudinal axis extending through the flexible coupler apparatus.

Accordingly, the degrees of freedom of movement of the flexible coupler apparatus, and in particular, the inner and outer liner tubes of the flexible coupler apparatus, is illustrated by the arrows in the upper left of FIG. 2.

In the embodiment disclosed in the embodiment of FIGS. 1–8, spacer member receiving region 14 is formed as a circumferentially extending recess axially bounded by shoulder 52 and lip 56, in which spacer member 28 dwells. Accordingly, depending upon the performance requirements of any particular application, and the depth and axial length of the recess created by the shoulder and lip of the inner liner tube, lip 66 may in some circumstances be omitted. In particular, if the anticipated maximum extent of axial extension of the coupler apparatus will not be so great as to pull the outer liner tube off of the inner liner tube, in the absence of a radially inwardly extending lip on the end of the outer liner tube, then the inwardly extending lip may possibly be omitted.

Figure 10:
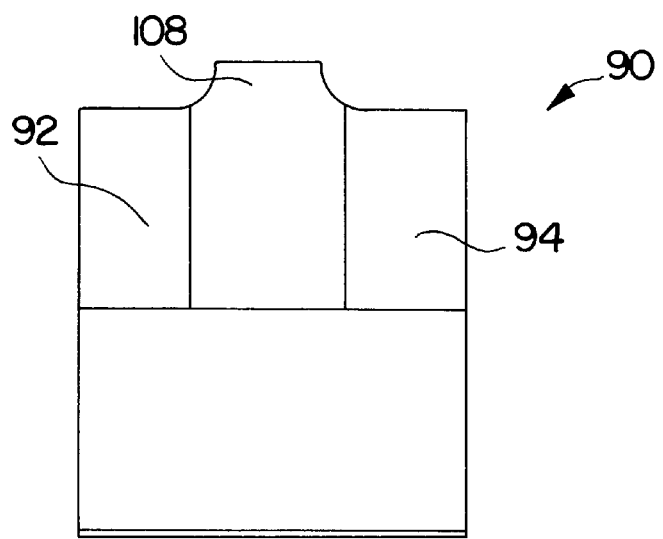
FIG. 10 is a side elevation of an outer liner tube according to another alternative embodiment of the invention.
Figure 11:
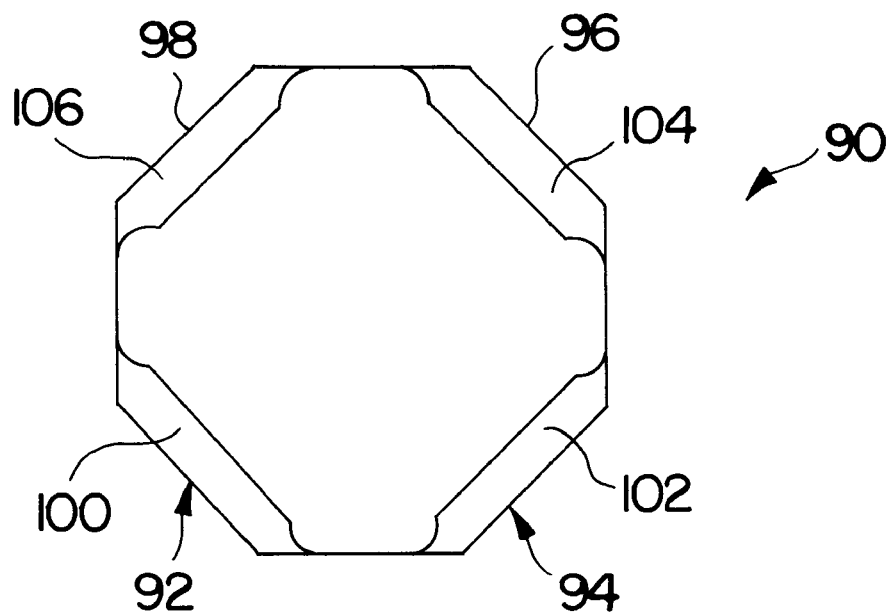
FIG. 11 is an end elevation of the outer liner tube according to the alternative embodiment of FIG. 10.

Providing a lip 66, around the entire circumference of the end of the spacer member receiving region of the outer liner tube does present some manufacturing issues, when the lip is being created as an inward turning of the end edge of a polygonal tube section. As an alternative, only the end edges of alternate flats may be performed, as shown in FIGS. 10 and 11. Outer liner tube 90 is provided with flats 92, 94, 96 and 98. The end edges of alternate ones of the flats are turned radially inward, to yield lips 100, 102, 104 and 106. This leaves axially projecting tabs, between the alternating lips, such as tab 108. While the purpose of the lips is to prevent overextension of the flexible coupler apparatus, it is believed not necessary that such lips must extend completely continuously around the circumference of each liner tube end, in view of the substantial robustness of material of the spacer members which are contemplated to be used in the present invention.

By providing the inner and outer liner tubes with geometrically similarly configured polygonal cross-sectional configurations, in the region in which they overlap, and by providing a geometrically similar polygonal cross-sectional configuration to the spacer member disposed in the annular space between the inner and outer liner tubes, the flexible coupler is provided with a mechanism by which torsional forces imposed upon one of the upstream or downstream exhaust system components is transferred directly to the other of the upstream or downstream exhaust system components. In this way, such torsional forces are transmitted through to structures which are more securely supported, more robust, and more capable of withstanding such torsional forces, than the relatively less robust bellows member which is likewise mechanically connected to the liner tubes. This enables the bellows structure to be made of thinner, lighter weight metal, resulting in potential cost and weight savings in the overall coupler structure. This protection of the bellows from torsional damage is believed to be achieved, without adversely affecting the ability of the coupler to attentuate transmission of pure transverse, axial and bending (about an axis transverse to the longitudinal axis L of the flexible coupler apparatus) vibrations which would otherwise propogate along the exhaust system.

The present invention has been illustrated hereinabove, in the embodiment of inner and outer liner tubes having spacer member receiving regions that are polygonal in cross-sectional configuration, particularly regular or substantially octagonal cross-sectional configurations. It is to be understood that other polygonal cross-sectional configurations, even irregular polygonal cross-sectional configurations, may be employed, subject to the requirements of any particular application, and subject to manufacturability and performance considerations. For example, square or triangular cross-sectional configurations may provide maximum protection from torsional forces, but may impact upon the capacity to attenuate axial, transverse and bending vibrations. In addition, such extreme deformations of originally cylindrical tubes, may require more effort and expense, or result in more strain upon the metal, than less extreme deformations, such as result in the octagonal configuration.

Figure 12:
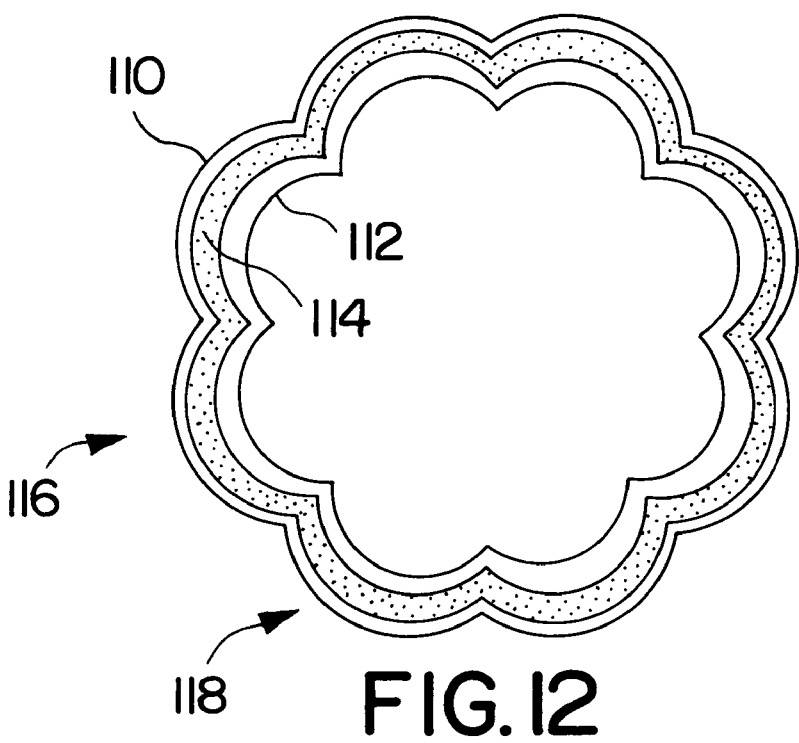
FIG. 12 is a cross-sectional elevation of the outer liner tube, spacer member, and inner liner tube of a flexible coupler apparatus, according to another embodiment of the present invention.

Indeed, other faceted (e.g., many-sided) shapes, without clearly defined flats, may be employed, without departing from the scope of the present invention. For example, FIG. 12 illustrates a cross-sectional configuration of a coupler apparatus according to such an alternative configuration. Outer liner tube 110 has a spacer member receiving region which is lobed in cross-section, without flats. Inner liner tube 112 has a geometrically similar lobed cross-sectional configuration, and spacer member 114 has a corresponding cross-sectional configuration. Such a lobed configuration may be produced, with deformations of the metal which are lesser in magnitude, than comparable deformations produced in a tube, which result in the creation of defined flats. The embodiment of FIG. 12 still includes sharp corners, where ends of adjacent arcuate lobes (e.g., lobes 116, 118) adjoin one another. This embodiment may be still further "softened" by rounding the "corners", to provide outwardly concave troughs, thus still creating a cross-section suitable for providing transmission of torsion from the inner liner tube to the outer liner tube, for protecting the bellows (not shown in FIG. 12), while minimizing the abruptness of localized deformations of the metal.

Returning to the discussion of the embodiment of FIGS. 1–8, when flexible coupler apparatus 10 is positioned between the free ends of successive sections of exhaust pipe to be connected, coupler apparatus 10 is typically positioned so that inner liner tube 12 is affixed to the upstream exhaust system component, such as an exhaust manifold. In that way, the exhaust gases proceed through the narrower of the two concentrically arranged sleeve members first, and the gases are thus less likely to be driven by the exhaust pressure into the gap between the sleeve members where they overlap. However, depending upon the particular application, it may be desirable, for other reasons, to reverse the orientation of the coupler apparatus, so that the outer liner tube is upstream and the inner liner tube is downstream.

In addition to longitudinal forces, an exhaust pipe system is exposed to bending forces normal to the longitudinal direction of the pipes. Flexible coupler apparatus 10 is configured to absorb such bending forces, without transmitting them to the pipes, thus relieving the pipes from further fatigue wear and lengthening the useful lifespan of the pipes.

Figure 9:
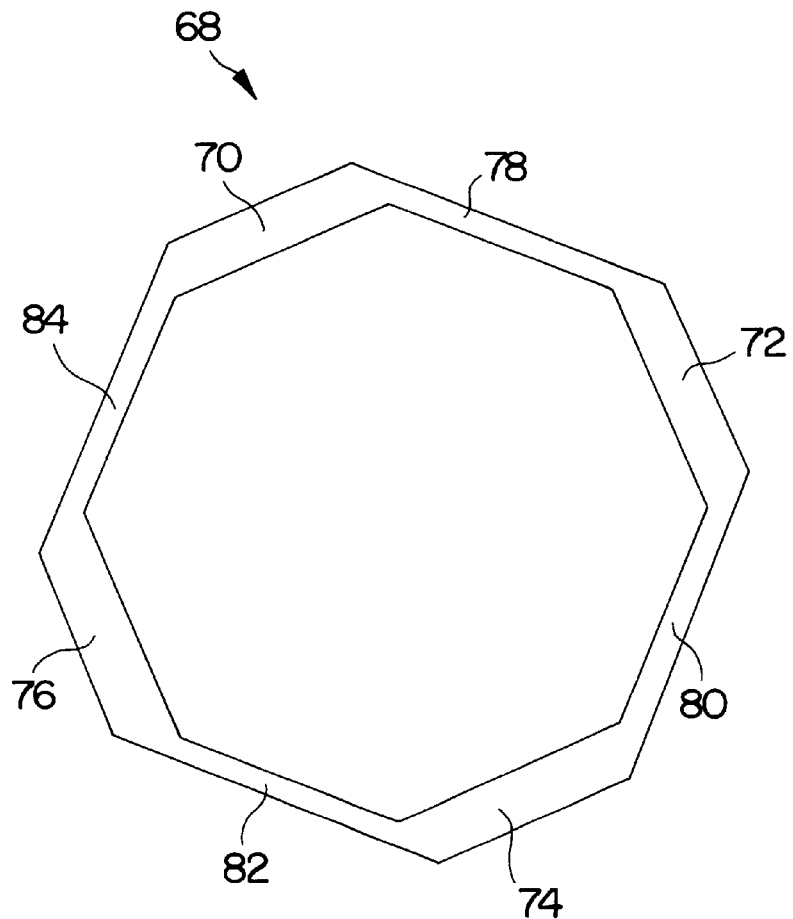
FIG. 9 is an elevation of a spacer member according to an alternative embodiment of the invention.

It may be desirable to create a flexible coupler apparatus in accordance with the principles of the invention discussed hereinabove, which is further capable of providing variable resistance to bending, in a direction about an axis transverse to the longitudinal axis of the coupler. This may be accomplished by providing a spacer member, which has a variable thickness about its circumference. FIG. 9 illustrates spacer member 68, which has sides 70, 72, 74 and 76, which have a first thickness, and sides 78, 80, 82 and 84, which have a second, lesser, thickness. Such a spacer member may be constructed by suitable alteration of the geometry of the forming equipment, at the time the metal mesh material of the spacer member is compressed, preferably beginning with an annular member having a substantially uniform radial thickness along its circumference. Accordingly, the sides which are thinner, in the finished structure, are more highly compressed, denser, and thus more resistant to further compression, such as occurs during bending movements. Preferably, the geometries of the spacer member receiving regions of the inner and outer liner tubes will likewise be similarly modified, during their formation processes, to accommodate the modified structure of the spacer member, in order to provide a snug fit along all of the flats of the spacer member. Various methods for fabrication of the spacer member, and inner and outer liner tubes may be readily apprehended by one of ordinary skill in the art, having the present disclosure before them. Accordingly, further detailed description of such methods is unnecessary for the purposes of the present disclosure.

Alternatively, the spacer member 68, having variable thickness about its circumference could be employed with non-modified inner and outer liner tubes, in which the regular geometries of the spacer member receiving regions, as shown in the embodiment FIGS. 3–6, could be maintained, which would result in direct, snug contact between the inner and outer liner tubes, and the spacer member, only along the thicker sides of spacer member 68, with air gaps between the spacer member 28 and the inner and outer liner tubes, along the thinner sides of the spacer member. Such a construction would likewise result in a coupler having different bending characteristics, depending upon its rotational orientation upon installation.

The foregoing embodiments of the flexible couple apparatus have the advantageous feature of providing enhanced audio isolation, via the bellows, and via vibration attenuation, in reducing or precluding transmission of motor noise from the exhaust pipe system into the passenger compartment of the vehicle.

A further benefit derived from the foregoing embodiments is that while the configurations accommodate axial, transverse and bending vibrations to preclude transmission of same along the exhaust component system, the flexible coupler apparatus provides a supporting connection between the two exhaust system components that are being connected such that the need of an external support, such as a bracket or stringer suspended from the body or chassis of the vehicle is substantially eliminated.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A flexible coupler apparatus for connecting adjacent ends of first and second successive components in a fluid transmission system, while substantially precluding transmission of axial, transverse and bending forces between the successive components, the flexible coupler apparatus comprising:

an inner liner tube, having an end operably affixable, at least indirectly, to the first of the successive components, and having a free end, and further having a spacer member receiving region, the spacer member receiving region of the inner liner tube being disposed about an outer surface thereof;

an outer liner tube, having an end operably affixable, at least indirectly, to the second of the successive components, and having a free end, and further having a spacer member receiving region, the spacer member receiving region of the outer tube member being disposed about an inner surface thereof;

the free end of the outer liner tube insertingly receiving and axially overlapping the free end of the inner liner tube, so that the spacer receiving region of the outer liner tube substantially axially overlaps the spacer receiving region of the inner liner tube;

an annular space, disposed between the inner surface of the spacer receiving region of the outer liner tube and the outer surface of the spacer receiving region of the inner liner tube;

the inner and outer liner tubes being operably configured for axial, transverse and bending movements relative to one another, to, in turn, enable axial, transverse and bending movements of the first and second successive components of the fluid transmission system relative to one another;

a vibration absorbing spacer member positioned in the annular space between the inner surface of the spacer receiving region of the outer liner tube and the outer surface of the spacer receiving region of the inner liner tube, for maintaining the inner surface of the spacer receiving region of the outer liner tube in radially spaced relation to the outer surface of the spacer receiving region of the inner liner tube, and for substantially precluding transmission of axial, transverse and bending movements between the inner and outer liner tubes;

the vibration absorbing spacer member permitting the inner liner tube to axially slide relative to the outer liner tube;

a resilient sealing member sealingly affixed, at least indirectly, at one end to the outer liner tube and at the other end, to the inner liner tube, for maintaining the first and second successive components in flexible joined relation to one another, and preclude escape of fluid from the flexible coupler apparatus; and at least each of the inner surface of the spacer member receiving region of the outer liner tube, the outer surface of the spacer member receiving region of the inner liner tube and the spacer member, having a non-circular, substantially faceted cross-sectional configuration, with the vibration absorbing spacer member being conformed to have inner and outer circumferential surfaces that substantially correspond to the adjacent outer surface of the spacer receiving region of the inner liner tube and the adjacent inner surface of the spacer receiving region of the outer liner tube, to, in turn, transmit applied torsional forces from said one of the inner and outer liner members to the other of the inner and outer liner tubes, towards substantially reducing the extent to which such torsional forces are borne by said resilient sealing member.

2. The flexible coupler apparatus according to claim 1, wherein the resilient sealing member comprises a flexible tubular bellows having a plurality of circumferential convolutions formed thereon.

3. The flexible coupler apparatus according to claim 1, wherein the spacer member is fabricated from compressed mesh material.

4. The flexible coupler apparatus according to claim 1, wherein the spacer member is fabricated from at least one material from the group consisting of metal mesh, ceramic wool.

5. A flexible coupler apparatus for connecting adjacent ends of first and second successive components in a fluid transmission system, while substantially precluding transmission of axial, transverse and bending forces between the successive components, the flexible coupler apparatus comprising:

an inner liner tube, having an end operably affixable, at least indirectly, to the first of the successive components, and having a free end, and further having a spacer member receiving region, the spacer member receiving region of the inner liner tube being disposed about an outer surface thereof;

an outer liner tube, having an end operably affixable, at least indirectly, to the second of the successive components, and having a free end, and further having a spacer member receiving region, the spacer member receiving region of the outer tube member being disposed about an inner surface thereof;

the free end of the outer liner tube insertingly receiving and axially overlapping the free end of the inner liner tube, so that the spacer receiving region of the outer liner tube substantially axially overlaps the spacer receiving region of the inner liner tube;

an annular space, disposed between the inner surface of the spacer receiving region of the outer liner tube and the outer surface of the spacer receiving region of the inner liner tube;

the inner and outer liner tubes being operably configured for axial, transverse and bending movements relative to one another, to, in turn, enable axial, transverse and bending movements of the first and second successive components of the fluid transmission system relative to one another;

a vibration absorbing spacer member positioned in the annular space between the inner surface of the spacer receiving region of the outer liner tube and the outer surface of the spacer receiving region of the inner liner tube, for maintaining the inner surface of the spacer receiving region of the outer liner tube in radially spaced relation to the outer surface of the spacer receiving region of the inner liner tube, and for substantially precluding transmission of axial, transverse and bending movements between the inner and outer liner tubes;

the vibration absorbing spacer member permitting the inner liner tube to axially slide relative to the outer liner tube;

a resilient sealing member sealingly affixed, at least indirectly, at one end to the outer liner tube and at the other end, to the inner liner tube, for maintaining the first and second successive components in flexible joined relation to one another, and preclude escape of fluid from the flexible coupler apparatus; and at least each of the inner surface of the spacer member receiving region of the outer liner tube, the outer surface of the spacer member receiving region of the inner liner tube and the spacer member, having a non-circular, substantially faceted cross-sectional configuration, to transmit applied torsional forces from said one of the inner and outer liner members to the other of the inner and outer liner tubes, towards substantially reducing the extent to which such torsional forces are borne by said resilient sealing member;

the non-circular, substantially faceted cross-sectional configuration of said at least each of the inner surface of the spacer member receiving region of the outer liner tube, the outer surface of the spacer member receiving region of the inner liner tube and the spacer member being a polygon.

6. The flexible coupler apparatus according to claim 5, wherein the polygon is a regular octagon.

7. The flexible coupler apparatus according to claim 5, wherein the polygonal spacer member has a plurality of sides, wherein at least one of the sides has a radial thickness which is substantially different from at least one other of the sides.

8. A flexible coupler apparatus for connecting adjacent ends of first and second successive components in a fluid transmission system, while substantially precluding transmission of axial, transverse and bending forces between the successive components, the flexible coupler apparatus comprising:

an inner liner tube, having an end operably affixable, at least indirectly, to the first of the successive components, and having a free end, and further having a spacer member receiving region, the spacer member receiving region of the inner liner tube being disposed about an outer surface thereof;

an outer liner tube, having an end operably affixable, at least indirectly, to the second of the successive components, and having a free end, and further having a spacer member receiving region, the spacer member receiving region of the outer tube member being disposed about an inner surface thereof;

the free end of the outer liner tube insertingly receiving and axially overlapping the free end of the inner liner tube, so that the spacer receiving region of the outer liner tube substantially axially overlaps the spacer receiving region of the inner liner tube;

an annular space, disposed between the inner surface of the spacer receiving region of the outer liner tube and the outer surface of the spacer receiving region of the inner liner tube;

the inner and outer liner tubes being operably configured for axial, transverse and bending movements relative to one another, to, in turn, enable axial, transverse and bending movements of the first and second successive components of the fluid transmission system relative to one another;

a vibration absorbing spacer member positioned in the annular space between the inner surface of the spacer receiving region of the outer liner tube and the outer surface of the spacer receiving region of the inner liner tube, for maintaining the inner surface of the spacer receiving region of the outer liner tube in radially spaced relation to the outer surface of the spacer receiving region of the inner liner tube, and for substantially precluding transmission of axial, transverse and bending movements between the inner and outer liner tubes;

the vibration absorbing spacer member permitting the inner liner tube to axially slide relative to the outer liner tube;

a resilient sealing member sealingly affixed, at least indirectly, at one end to the outer liner tube and at the other end, to the inner liner tube, for maintaining the first and second successive components in flexible joined relation to one another, and preclude escape of fluid from the flexible coupler apparatus; and at least each of the inner surface of the spacer member receiving region of the outer liner tube, the outer surface of the spacer member receiving region of the inner liner tube and the spacer member, having a non-circular, substantially faceted cross-sectional configuration, to transmit applied torsional forces from said one of the inner and outer liner members to the other of the inner and outer liner tubes, towards substantially reducing the extent to which such torsional forces are borne by said resilient sealing member;

the non-circular, non-continuously curved cross-sectional configuration of each of the inner surface of the spacer member receiving region of the outer liner tube, the outer surface of the spacer member receiving region of the inner liner tube and the spacer member being a lobed configuration.

9. A flexible coupler apparatus for connecting adjacent ends of first and second successive components in a fluid transmission system, while substantially precluding transmission of axial, transverse and bending forces between the successive components, the flexible coupler apparatus comprising:

an inner liner tube, having an end operably affixable, at least indirectly, to the first of the successive components, and having a free end, and further having a spacer member receiving region, the spacer member receiving region of the inner liner tube being disposed about an outer surface thereof;

an outer liner tube, having an end operably affixable, at least indirectly, to the second of the successive components, and having a free end, and further having a spacer member receiving region, the spacer member receiving region of the outer tube member being disposed about an inner surface thereof;

the free end of the outer liner tube insertingly receiving and axially overlapping the free end of the inner liner tube, so that the spacer receiving region of the outer liner tube substantially axially overlaps the spacer receiving region of the inner liner tube;

an annular space, disposed between the inner surface of the spacer receiving region of the outer liner tube and the outer surface of the spacer receiving region of the inner liner tube;

the inner and outer liner tubes being operably configured for axial, transverse and bending movements relative to one another, to, in turn, enable axial, transverse and bending movements of the first and second successive components of the fluid transmission system relative to one another;

a vibration absorbing spacer member positioned in the annular space between the inner surface of the spacer receiving region of the outer liner tube and the outer surface of the spacer receiving region of the inner liner tube, for maintaining the inner surface of the spacer receiving region of the outer liner tube in radially spaced relation to the outer surface of the spacer receiving region of the inner liner tube, and for substantially precluding transmission of axial, transverse and bending movements between the inner and outer liner tubes;

the vibration absorbing spacer member permitting the inner liner tube to axially slide relative to the outer liner tube;

a resilient sealing member sealingly affixed, at least indirectly, at one end to the outer liner tube and at the other end, to the inner liner tube, for maintaining the first and second successive components in flexible joined relation to one another, and preclude escape of fluid from the flexible coupler apparatus; and at least each of the inner surface of the spacer member receiving region of the outer liner tube, the outer surface of the spacer member receiving region of the inner liner tube and the spacer member, having a non-circular, substantially faceted cross-sectional configuration, to transmit applied torsional forces from said one of the inner and outer liner members to the other of the inner and outer liner tubes, towards substantially reducing the extent to which such torsional forces are borne by said resilient sealing member; and stop member for limiting axial movement of the inner liner tube relative to the outer liner tube.

10. The flexible coupler apparatus according to claim 9, wherein the stop members for limiting axial movement of the inner liner tube relative to the outer liner tube comprises:

at least a first lip extending radially inwardly from at least a portion of the free end of the outer liner tube; and at least a second lip extending radially outwardly from at least a portion of the free end of the inner liner tube.

11. A flexible coupler apparatus for connecting adjacent ends of first and second successive components in a fluid transmission system, while substantially precluding transmission of axial, transverse and bending forces between the successive components, the flexible coupler apparatus comprising:

an inner liner tube, having an end operably affixable, at least indirectly, to the first of the successive components, and having a free end, and further having a spacer member receiving region, the spacer member receiving region of the inner liner tube being disposed about an outer surface thereof;

an outer liner tube, having an end operably affixable, at least indirectly, to the second of the successive components, and having a free end, and further having a spacer member receiving region, the spacer member receiving region of the outer tube member being disposed about an inner surface thereof;

the free end of the outer liner tube insertingly receiving and axially overlapping the free end of the inner liner tube, so that the spacer receiving region of the outer liner tube substantially axially overlaps the spacer receiving region of the inner liner tube;

an annular space, disposed between the inner surface of the spacer receiving region of the outer liner tube and the outer surface of the spacer receiving region of the inner liner tube;

the inner and outer liner tubes being operably configured for axial, transverse and bending movements relative to one another, to, in turn, enable axial, transverse and bending movements of the first and second successive components of the fluid transmission system relative to one another;

a vibration absorbing spacer member positioned in the annular space between the inner surface of the spacer receiving region of the outer liner tube and the outer surface of the spacer receiving region of the inner liner tube, for maintaining the inner surface of the spacer receiving region of the outer liner tube in radially spaced relation to the outer surface of the spacer receiving region of the inner liner tube, and for substantially precluding transmission of axial, transverse and bending movements between the inner and outer liner tubes;

the vibration absorbing spacer member permitting the inner liner tube to axially slide relative to the outer liner tube;

a resilient sealing member sealingly affixed, at least indirectly, at one end to the outer liner tube and at the other end, to the inner liner tube, for maintaining the first and second successive components in flexible joined relation to one another, and preclude escape of fluid from the flexible coupler apparatus; and at least each of the inner surface of the spacer member receiving region of the outer liner tube, the outer surface of the spacer member receiving region of the inner liner tube and the spacer member, having a noncircular, substantially faceted cross-sectional configuration, to transmit applied torsional forces from said one of the inner and outer liner members to the other of the inner and outer liner tubes, towards substantially reducing the extent to which such torsional forces are borne by said resilient sealing member; and at least one end cap, operably disposed about an end of the resilient sealing member and operably configured for substantially circumferentially surrounding at least a portion of the resilient sealing member for substantially protecting same against undesired contact from external forces.

\* \* \* \* \*